April 29, 1941.
R. RING
2,240,417
APPARATUS FOR SURVEYING WELLS
Filed Oct. 7, 1938
2 Sheets-Sheet 1
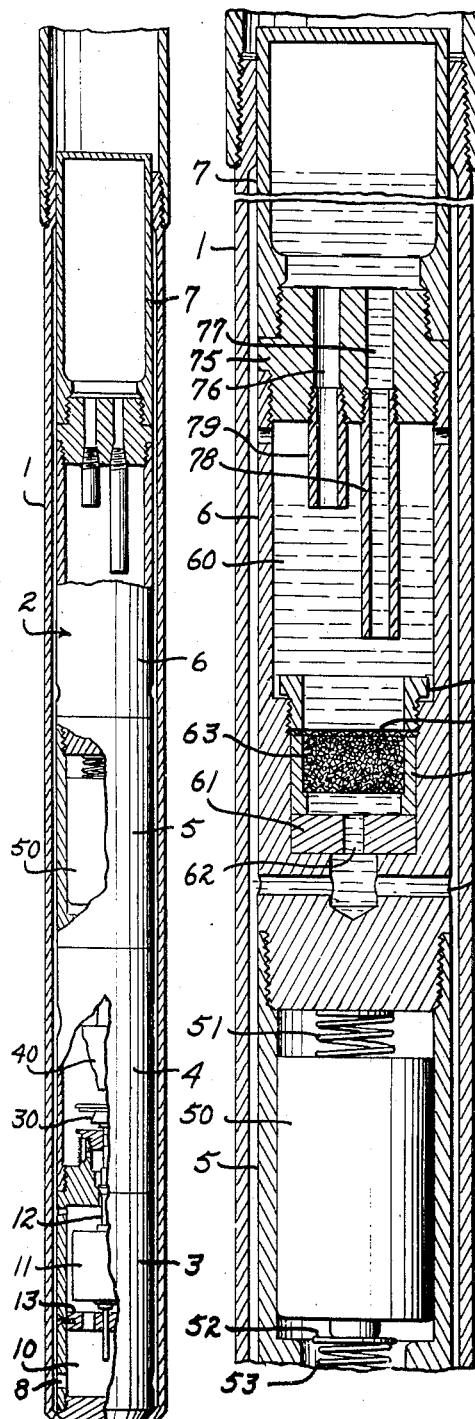
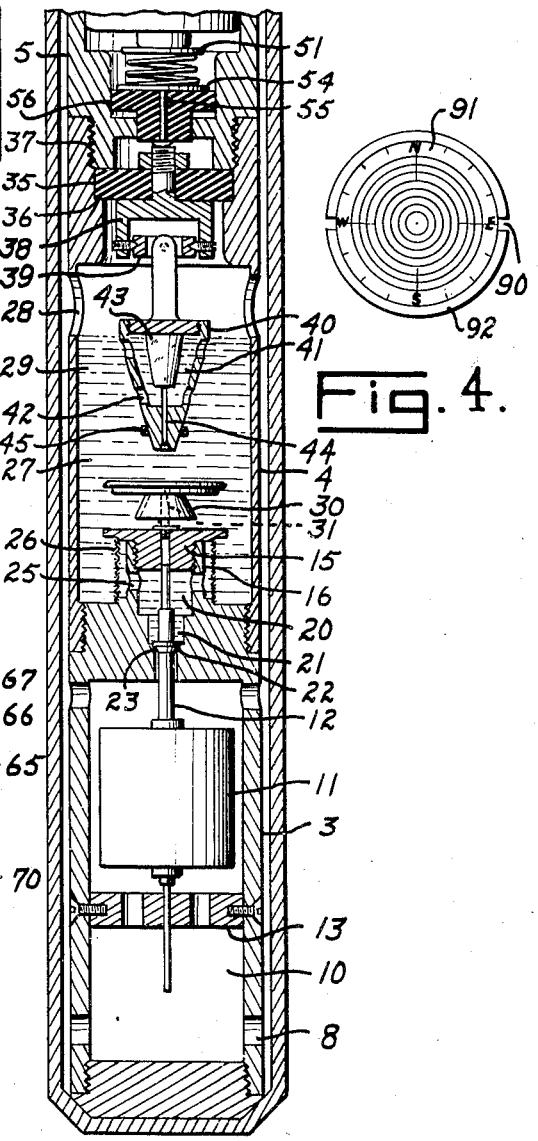
Inventor
ROLAND RING
Jesse P. Stone
Lester B. Clark
Attorneys April 29, 1941.  R. RING  2,240,417
APPARATUS FOR SURVEYING WELLS
Filed Oct. 7, 1938  2 Sheets-Sheet 2

Inventor
ROLAND RING
Jesse P. Stone
Lester B. Clark
Attorneys

Patented Apr. 29, 1941

2,240,417

UNITED STATES PATENT OFFICE 2,240,417

APPARATUS FOR SURVEYING WELLS

Roland Ring, Houston, Tex., assignor to Sperry-Sun Well Surveying Company, Philadelphia, Pa., a corporation of Delaware Application October 7, 1938, Serial No. 233,767

18 Claims. (Cl. 33—205.5)

The invention relates to an oil well surveying instrument to be lowered to a predetermined level within a well bore to form a record indicating the direction and amount of inclination of the well bore at such level.

The primary object of the invention is to provide a surveying instrument which is simple in construction and operation and which is inexpensive to manufacture and operate.

Another object is to provide a device of the class described to be lowered to a desired level so that at the end of a predetermined interval of time the device will positively and accuartely record the direction and amount of inclination of the bore hole at that level.

Still another object is to provide a device which may be constructed of either large or small diameter without affecting the utility or accuracy of the instrument.

Still another object is to provide a surveying device which may be mounted either upon the end of a tubing string or upon a wire line.

Another object is to provide a surveying instrument which is so designed that the record produced upon an indicator card is produced electrically.

Still another object is to provide a device in which, at the end of a predetermined interval of time the point of a freely suspended bob is brought into contact with an indicator card to close an electric circuit and produce a record.

Still another object is to provide a device which is liquid operated so that the timing of the device and other operations thereof are carried out through the instrumentality of a volume of liquid within the device.

Still another object is to provide a device having a specially constructed plumb bob which is so designed that the position of the point relative to the body of the bob is controlled by the level of a liquid surrounding the bob.

Other objects together with the foregoing and advantages of the invention will be apparent from the following description taken in connection with the accompanying drawings in which Fig. 1 is an assembly view of a device embodying the invention, parts being shown in section to more clearly illustrate the construction of the device.

Figs. 2 and 3 are enlarged sectional views of the upper and lower portions of the device shown in Fig. 1 with parts in relative positions when the device is lowered into the bore hole.

Fig. 4 illustrates a compass or indicator card which is used as an element of the device.

Figure 5:
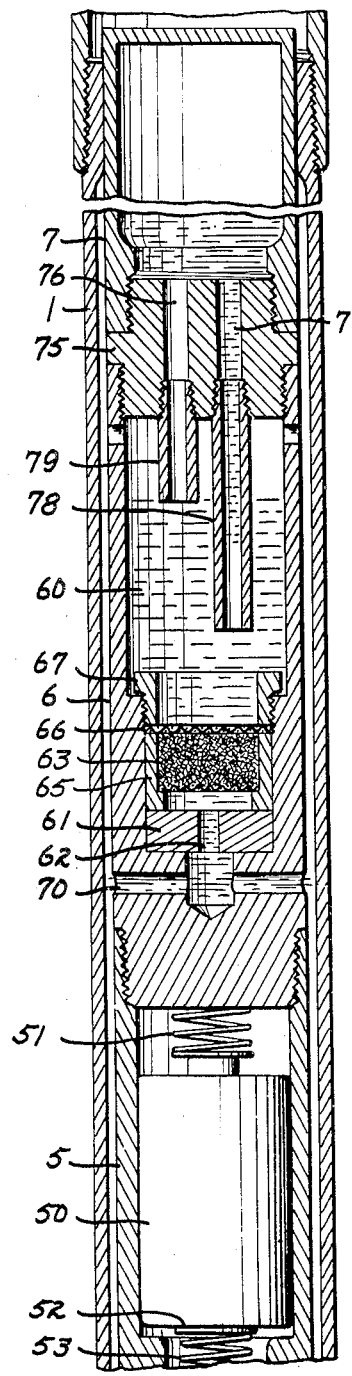
Figs. 5 and 6 are views similar to Figs. 2 and 3 but illustrate the relative position of parts at the instant an electric circuit is closed to produce a record upon the indicator card.

The device comprising the invention is illustrated in Fig. 1 as comprising a container 1 within which is positioned a composite assembly generally indicated as 2 and comprising superposed units 3, 4, 5, 6 and 7.

The device thus generally described may be attached to the lower end of a tubing string or to a wire line and be lowered into a well bore to a predetermined level to provide the desired record indicating the direction and inclination of the bore hole at that level.

The lowermost unit 3 which rests upon the bottom of the container 1 has a central chamber 10 within which is positioned a float 11 mounted upon a spindle 12. The lower end of the spindle 12 is guided in an opening in the transverse guide block 13 while the upper end of the spindle is similarly guided in an opening in plug 15 secured in an upwardly extending boss 16 at the upper end of the unit 3.

The boss 16 has a central bore 20 reduced in cross section at 21 near its lower end and has a valve seat 22 to cooperate with a complementary valve member 23 on the spindle 12. The boss 16 is provided with openings 25 and a screen or strainer 26 so that the fluid may be admitted to the bore 20 and pass downwardly through the valve 23 for a purpose that will be made more fully apparent.

The unit 4 has a compass chamber 27 provided with openings 28 at its upper end so that such chamber may contain a suitable liquid 29 to be released from the chamber upon actuation of the valve 23.

A compass 30 is mounted upon pivot point 31 which is secured to the upper end of the plug 15. While this compass is preferably a magnetic compass it is contemplated that the invention shall not be confined thereto but that any suitable direction indicating device may be used.

An insulating block 35 is held securely in place between the units 4 and 5 by the provision of shoulder 36 against which the block is held by virtue of the threaded connection 37 between these units. A yoke 38 is mounted centrally of the block 35 and extends downwardly therefrom. A gimbal ring 39 is attached to the lower end of the yoke 38 and supports a plumb bob 40.

The block 35 centrally supports the plumb bob 40 within the chamber 27 and insulates the bob from the remainder of the device.

The plumb bob 40 is of special construction in that it is provided with a central chamber 41 to which fluid may be admitted through openings 42. Within the chamber 41 is positioned a float 43 to which is attached a pointed rod or needle 44 which passes downwardly through the opening at the lower end of the bob. In this manner the needle 44 may move longitudinally of the bob but will at the same time have electrical contact therewith. Surrounding the bob 40 at its lower end is an insulating ring 45 which is provided to prevent conductive contact of the bob with the walls of the chamber in the event the device is subjected to extreme inclination.

The lower end of the unit 6 is threadably connected to the unit 5 to enclose within the latter one or more dry cells 50 of which a single cell is shown in the illustration. When a plurality of dry cells are used they may be assembled one above the other as in an ordinary flashlight and contact is made therewith through a spring 51 which grounds the zinc shell of the battery with the main body of the assembled device.

The central or carbon terminal of the battery is connected through a washer 52 and spring 53 to washer 54 which contacts a rivet 55 passing through insulated block 56. The head of the rivet 55 engages the upper end of the yoke 38 and hence one terminal of the battery is connected directly to the plumb bob 40 while the other terminal of the battery is connected to the compass 30.

Unit 6 has a central chamber 60 and is designed to secure a constant rate of flow of liquid from unit 7 to the lowermost units of the device. The rate of flow of the liquid is controlled by means of a disc 61 at the lower end of the chamber, such disc having an orifice 62 of suitable dimensions. A filter or strainer 63 is placed within the chamber 60 above the orifice 62 in order to remove any particles that would tend to close the orifice. This strainer comprises a cylinder 65 filled with sand or other suitable granular material and is sealed at its upper end by means of a fine wire strainer or cloth 66 held in place by means of threaded ring 67.

Below the orifice 62 there are provided radial openings 70 so that fluid passing downwardly through the orifice will pass outwardly into an annular space between the assembly 2 and surrounding container 1.

Unit 7 is an inverted liquid receptacle which is filled with liquid preliminary to final assembly of the device before lowering into a bore hole to obtain a reading. This receptacle is secured to the unit 6 by means of a nipple 75 provided with passageways 76 and 77. The tubes 78 and 79 of different lengths are secured in these passageways at their lower ends. In this manner liquid from the unit 7 passes downwardly through the longer of these tubes while the shorter tube is instrumental in determining the level to which liquid will rise in the chamber 60 and hence a uniform head of liquid above the orifice 62 will be maintained and the time of flow of liquid downwardly within the device may be accurately determined.

Figure 6:
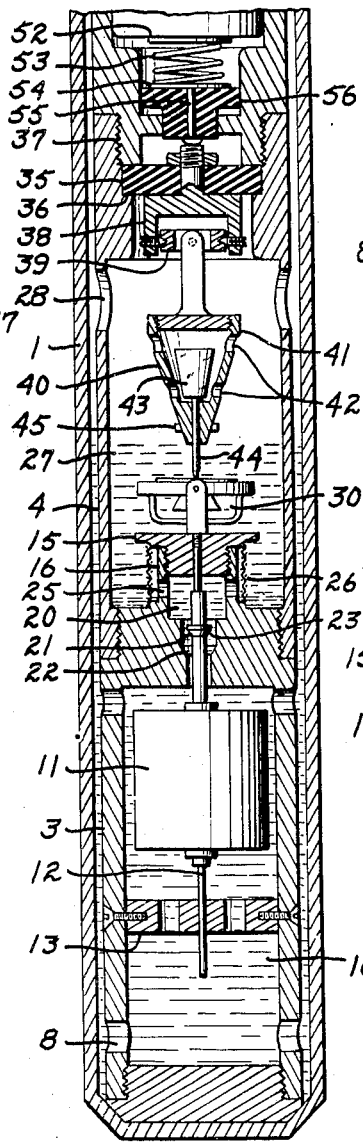
Figure 8:
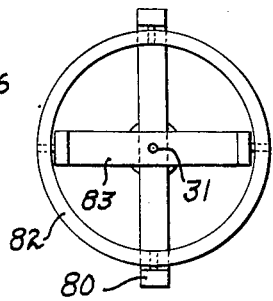
Figs. 7 and 8 are respectively vertical section and a plan view of a compass which may be used in the device of the invention.
Figure 7:
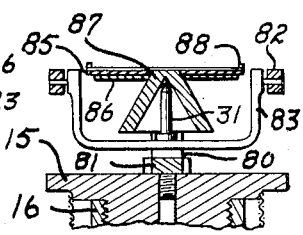

The compass illustrated in Fig. 3 is shown in a modified form in Fig. 6 and this modification is shown in greater detail in Figs. 7 and 8 to which attention is now directed. This form of compass is particularly desirable where a record is being obtained of large inclinations. This construction provides an outer yoke 80 having a mounting projection 81 whereby the compass is threadably secured to the plug 15. A gimbal ring 82 is pivotally mounted upon the yoke 80. An inner yoke 83 is likewise mounted within the gimbal ring 82 but at right angles to the yoke 80 and has an upwardly extending hardened steel pivot pin 31 mounted centrally thereof to support the moving element of the compass.

Regardless of the type of mounting used the indicating element thereof comprises a metal disc 85 which is secured to the magnetic needle 86. These elements are in turn secured to a cone shaped member 87 whereby the assembly is pivotally mounted upon the pivot pin 31.

Turned up lugs 88 on the disc 85 are adapted to fit within the notches 90 of the indicator card 91 shown in Fig. 4. This card is a composite disc of metal foil superposed upon a cardboard so that the central portion of the disc will be electrically insulated from the disc 85 of the compass. The periphery 92 of the card 91 projects over the edges of the disc 85 and are beaded downwardly about the edge of the disc 85 so that the card 91 will be held in place upon the compass and at the same time there will be electrical contact of the foil with the disc 85.

In the smallest size of instrument it is necessary to use as small a battery as possible. The current from the small size battery is limited and it is therefore desirable to use a modified form or electrolytic type of card 91. Such a card may be provided by using a heavy blueprint paper which is first exposed to light and is then fixed so that it exhibits the characteristic dark blue color. Discs are cut from a sheet of this paper, such discs having the cardinal points of the compass and concentric circles printed thereon. Just before one of these discs is placed upon the compass disc 85 it is soaked in a suitable solution such as sodium chloride and is then placed upon the disc 85 where it is secured in place by any suitable means such as a metal rim or metallic clips. The battery 50 is reversed so that the zinc shell of the battery is connected to the needle 44. Hence when the needle makes contact with the wet disc a white spot will be produced thereon at the point of contact due to electrolytic action which takes place at the surface of the paper disc. This action will take place in a satisfactory manner even thought the entire compass be submerged in an oil, such as kerosene, as will be more fully apparent from the description of the operation of the device.

In using the described device for its intended purpose the superposed units of the assembly 2 are disassembled, the plumb bob and compass are removed and any liquid within the units is drained off. The units 3 and 4 are then secured together. The compass card is fitted upon the compass in the manner described and the compass is placed upon its pivot 31. A liquid such as kerosene is now poured into the chamber 27 without disturbing its contents and the chamber is filled to the lower edge of the openings 28. Float 11 is in its lowermost position and the valve 23 is closed upon its seat 22.

The plumb bob assembly is now inserted into the upper end of the unit 4 and is secured in place by screwing the unit 5 into the upper end of the unit 4. The buoyancy of the float 43 is sufficient to hold the needle 44 in elevated position so that contact with the indicator card 91 will not take place.

A battery is now placed in the unit 5 and unit 6 is attached thereto. Unit 7 previously filled with a suitable liquid is then inverted and is threadably attached to the upper end of the unit 6 to complete the assembly which is then placed within the container 1 so that the device is ready for use.

The instrument starts its cycle of operation as soon as all the units are completely assembled at which time the driller or operator notes the time at which operation is begun. It is known by previous calibration of the instrument the length of time allowed for lowering the device to the desired level, and it is therefore known the length of time during which the instrument must remain stationary at that level in order that the desired record will be produced.

Liquid moving downwardly through the orifice 62 enters the annular chamber within the container 1 and enters the lower end of the assembly 2 through openings 8 and rises within the chamber 10 so that the float 11 will be lifted at the end of a predetermined interval of time. The lifting of the float 11 causes the valve 23 to be lifted from its seat whereupon the liquid within the chamber 27 will pass downwardly through the valve and will permit the float 43 and needle 44 to be lowered until the latter comes into contact with the card upon the compass 30. Such contact causes a closure of an electric circuit from the battery 50 so that the desired record will be produced. If an indicator card of foil is used such a record is produced by the formation of a pin hole in the card at the instant the circuit is closed. On the other hand if an electrolytic type of card is used a small spot will be produced in the manner already described.

By the time the needle 44 has made contact with the indicator card, liquid has filled the float chamber 10 and will have attained a level at or slightly above the compass 30. The flow from the reservoir 7 however continues and the liquid rises in the chamber 27 so that at the end of a short period of time the float 43 will again be lifted and the instrument is ready to be removed from the hole. Since the needle 44 is lifted from contact with the indicator card 91 there is no danger of injuring the record during subsequent movement of the device in coming out of the hole.

The materials used in constructing the instrument including the casing 1 are of non-magnetic material such as brass or aluminum with the exception of the parts of the compass itself. In this manner the bearing of the compass will not be affected by magnetic attraction of any part of the instrument itself.

It is believed obvious that if inclination only is desired the instrument may be constructed without a compass, the card 91 being merely suitably mounted in position beneath the bob 40.

Broadly the invention comprehends a well surveying device in which the interval preceding the production of the desired record is controlled by means of a liquid, the record being produced by contact of a suitable element of the indicator card after the liquid has reached a predetermined level.

What is claimed is:

1. In an oil well surveying instrument the combination of a float chamber, a float in said chamber, a compass chamber above the float chamber, valve means between said chambers to control the flow of liquid therebetween, a compass within the compass chamber, an indicator card on the compass, a bob suspended above the compass, said bob being so constructed that the point thereof is maintained in spaced relation with the indicator card by a liquid within the compass chamber, and means for admitting liquid to the float chamber to open said valve whereby the liquid in the compass chamber is lowered and the point of the bob engages the indicator card to produce a record thereon.

2. In an oil well surveying instrument, the combination of a float chamber, a float in said chamber, a compass chamber above the float chamber, valve means between said chambers to control the flow of liquid therebetween, a compass within the compass chamber, an indicator card on the compass, a bob suspended above the compass, said bob being so constructed that the point thereof is maintained in spaced relation with the indicator card by a liquid within the compass chamber, means for admitting liquid to the float chamber to open said valve whereby the liquid in the compass chamber is lowered and the point of the bob engages the indicator card to produce a record thereon, and means for thereafter breaking the contact of the bob with the indicator card.

3. In an oil well surveying instrument the combination of, a chamber, a compass mounted therein, an indicator card on the compass, a bob suspended above the compass, a liquid within said chamber, said bob being so constructed that the liquid within the chamber maintains the point of the bob in spaced relation with the compass, and means for releasing the liquid from the chamber at a predetermined time, whereby the point of the bob contacts the indicator card to form a record thereon.

4. In an oil well surveying instrument the combination of, a chamber, a compass mounted therein, an indicator card on the compass, a bob suspended above the compass, a liquid within said chamber, said bob being so constructed that the liquid within the chamber maintains the point of the bob in spaced relation with the compass, means for releasing the liquid from the chamber at a predetermined time, whereby the point of the bob contacts the indicator card to form a record thereon, and means for subsequently introducing liquid to the chamber to lift the point of the bob from the indicator card.

5. In an oil well surveying instrument of the class described, the combination of an electrically conducting indicator card, a pointed bob suspended above said card, an electric circuit including a source of current connected to said bob and said card, and means for bringing the point of the bob into contact with the card to close the circuit through contact of the point with the card to produce a mark on the card indicative of inclination of the device at the instant of closure of the circuit.

6. In a device of the class described, a container, a compass mounted therein, a bob suspended above said compass, said bob terminating in a point at its lower extremity, an electrically conducting indicator card mounted on said compass, a source of electric current, a circuit including connections from said source to said bob and card, and means for bringing the point of the bob into contact with the card to close said circuit.

7. In an oil well surveying instrument of the class described the combination of an electrically conducting indicator card, a pointed bob suspended above said card, an electric circuit including a source of current connected to said bob and card, means for bringing the point of the bob into contact with the card at a predetermined time to close the electric circuit, and means for thereafter opening said circuit.

8. In a device of the class described, a container, a compass mounted therein, an electrically conducting indicator card mounted on said compass, a bob suspended above the compass, said bob terminating in a point at its lower extremity, a source of electric current connected to each said bob and indicator card, means for bringing the point on the bob into contact with the indicator card at the end of a predetermined interval of time to electrically produce a mark thereon indicative of inclination and direction of the device at the time of contact, and means for thereafter withdrawing the point of the bob from contact with the indicator card so that the record on the card will not be altered by subsequent changes in inclination and direction of the device.

9. A well surveying device comprising a casing adapted to enter a bore hole, means for supporting a record member within said casing, a pendulum bob supported for movement adjacent said record member, a pin carried by said bob arranged to engage said record member, and a float secured to the pin and adapted to exert a buoyant action on said pin when surrounded by liquid.

10. A well surveying device comprising a casing adapted to enter a bore hole, means for supporting within said casing a record member adapted to be marked by the passage of current, a pendulum supported for movement adjacent said record member, means for successively preventing contact between said pendulum and record member, effecting contact between said pendulum and record member for a predetermined period, and then interrupting said contact, and a source of current continuously applying a voltage difference to said pendulum and record member so that upon making of said contact a circuit is completed providing a flow of current to mark the record member, said current flow requiring a substantial period for the marking of said record member so that movements of the pendulum during the period of contact will cause a failure of production of a proper record.

11. A well surveying device comprising a casing adapted to enter a bore hole, means for supporting within said casing a record member adapted to be marked by the passage of current, a pendulum supported for movement adjacent said record member, means for successively preventing contact between said pendulum and record member, and then effecting contact between said pendulum and record member, and a source of current continuously applying a voltage difference to said pendulum and record member so that upon making of said contact a circuit is completed providing a flow of current to mark the record member, said current flow requiring a substantial period for the marking of said record member so that movements of the pendulum during the period of contact will cause a failure of production of a proper record.

12. A well surveying device comprising a casing adapted to enter a bore hole, means for supporting within said casing a record member adapted to be marked by the passage of current, a pendulum supported for movement adjacent said record member, means for successively providing contact between said pendulum and record member and then interrupting said contact, and a source of current continuously applying a voltage difference to said pendulum and record member so that upon making of said contact a circuit is completed providing a flow of current to mark the record member, said current flow requiring a substantial period for the marking of said record member so that movements of the pendulum during the period of contact will cause a failure of production of a proper record.

13. A well surveying device comprising an elongated casing adapted to enter a bore hole, a compass mounted therein to move about an axis extending longitudinally of the casing, a record disc mounted on said compass transversely to said axis and adapted to be marked electrolytically by the passage of an electric current, a pendulum having a universal pivotal support above the compass and substantially in line with the compass axis and having point contact with said record disc, and a low voltage source of current for producing a current flow between the pendulum and record disc to effect slow electrolytic marking of the latter at the location of the pendulum contact therewith when, and only when, the pendulum occupies for a substantial period a position of rest relative to the record disc, the radial position of which marking is indicative of inclination, and the angular position of which marking is indicative of the relation of the inclination to a magnetic field.

14. A well surveying device comprising an elongated casing adapted to enter a bore hole, a compass mounted therein to move about an axis extending longitudinally of the casing, a record disc mounted on said compass transversely to said axis, a pendulum having a universal pivotal support above the compass and substantially in line with the compass axis, and slowly acting means for effecting marking of the record disc at the location of the pendulum adjacent thereto when, and only when, the pendulum occupies for a substantial period a position of rest relative to the record disc, the radial position of which marking is indicative of inclination, and the angular position of which marking is indicative of the relation of the inclination to a magnetic field.

15. A well surveying device comprising an elongated casing adapted to enter a bore hole, a compass mounted therein to move about an axis extending longitudinally of the casing, a record disc mounted on said compass transversely to said axis, a pendulum having a universal pivotal support above the compass and substantially in line with the compass axis, and slowly acting means for effecting marking of the record disc by color change at the location of the pendulum adjacent thereto when, and only when, the pendulum occupies for a substantiatl period a position of rest relative to the record disc, the radial position of which marking is indicative of inclination, and the angular position of which marking is indicative of the relation of the inclination to a magnetic field.

16. A well surveying device comprising an elongated casing adapted to enter a bore hole, a compass mounted therein to move about an axis extending longitudinally of the casing, a record disc mounted on said compass transversely to said axis and containing material adapted to be marked by chemical action, a pendulum having a universal pivotal support above the compass and substantially in line with the compass axis, and slowly acting means for effecting chemical change of said material at the location of the pendulum adjacent said disc to effect marking of the latter, when, and only when, the pendulum occupies for a substantial period a position of rest relative to the record disc, the radial position of which marking is indicative of inclination, and the angular position of which marking is indicative of the relation of the inclination to a magnetic field.

17. A well surveying device comprising an elongated casing adapted to enter a bore hole, a compass mounted therein to move about an axis extending longitudinally of the casing, a record disc mounted on said compass transversely to said axis, a pendulum having a universal pivotal support above the compass and substantially in line with the compass axis and having a portion moving adjacent said record disc, and slowly acting means for effecting marking of said disc at the location of said portion of the pendulum adjacent thereto to produce a marking on said disc when, and only when, the pendulum occupies for a substantial period a position of rest relative to the record disc, the radial position of which marking is indicative of inclination, and the angular position of which marking is indicative of the relation of the inclination to a magnetic field.

18. A well surveying device comprising an elongated casing adapted to enter a bore hole, a record member adapted to be marked electrolytically by the passage of an electric current, means for supporting said record member within the casing, a pendulum supported for universal pivotal movement and having point contact with said record member, and a low voltage source of current for producing a current flow between the pendulum and record member to effect slow electrolytic marking of the latter at the location of the pendulum contact therewith when, and only when, the pendulum occupies for a substantial period a position of rest relative to the record member.

ROLAND RING.